United States Patent [19]

Mortl et al.

[11] 4,049,461

[45] Sept. 20, 1977

[54] UNFIRED, REFRACTORY, BASIC BRICKS AND COMPOSITIONS AND THEIR METHOD OF MANUFACTURE

[75] Inventors: Günther Lorenz Mortl, Villach; Eckhart Werthmann; Günther Zoglmeyr, both of Radenthein, all of Austria

[73] Assignee: Osterreichisch-Amerkianische Magnesit Aktiengesellschaft, Radenthein, Austria

[21] Appl. No.: 345,315

[22] Filed: Mar. 27, 1973

[30] Foreign Application Priority Data

Mar. 31, 1972 Austria .................................. 2814/72

[51] Int. Cl.² .................... C04B 35/04; C04B 35/52
[52] U.S. Cl. .......................................... 106/56; 106/58; 106/63
[58] Field of Search ............................. 106/56, 58, 63

[56] References Cited

U.S. PATENT DOCUMENTS 3,236,664   2/1966   Wilson .................................. 106/56

Primary Examiner—J. Poer

Attorney, Agent, or Firm—Brian G. Brunsvold; Herbert H. Mintz; Everett H. Murray, Jr.

[57] ABSTRACT

Unfired, refractory compositions are provided containing a refractory material of magnesia, dolomite, lime or mixtures thereof, a carbonaceous binder, and elementary carbon. The amount of elementary carbon incorporated in the composition is controlled and depends on the amount of $Fe_2O_3$ present in the refractory material. The compositions are provided with at most 1.5% elementary carbon if the $Fe_2O_3$ content is below 0.5%; at most 1.75% elementary carbon if the $Fe_2O_3$ content is 0.5 to 2.5%, at most 2.0% elementary carbon if the $Fe_2O_3$ content is above 2.5 to 4.5%, and at most 2.5% elementary carbon if the $Fe_2O_3$ content is above 4.5%. Refractory shapes and bricks produced from these refractory compositions where the amount of elementary carbon is controlled according to the $Fe_2O_3$ content of the refractory material show an increased durability over similar refractory shapes and bricks where the elementary carbon addition is not made or where it is made in excess of the above critical amounts without regard to the $Fe_2O_3$ content.

8 Claims, No Drawings

UNFIRED, REFRACTORY, BASIC BRICKS AND COMPOSITIONS AND THEIR METHOD OF MANUFACTURE

The present invention relates to unfired, refractory, basic bricks and compositions consisting essentially of basic refractory material of magnesia, dolomite, lime or mixtures thereof, together with a carbonaceous binder and an admixture of elementary carbon, and to processes of producing such bricks and compositions. Refractory bricks are of primary interest in this connection and for this reason will be mainly referred to hereinafter.

It has been known for a long time to use carbonaceous binders, such as tar, pitch, bitumen, high-molecular hydrocarbons and synthetic resins, such as furan, resins, as binders for basic refractory bricks and compositions. The residual carbon remaining in the bricks after a thermal decomposition of these binders forms a coke skeleton, which is important not only for the integrity and strength of the bricks but also a slag-repellent activity, which is of great importance. Such a thermal decomposition of the binders can be performed already before the use of the bricks by heating the bricks in a non-oxidizing atmosphere at, e.g., 300°–1000° C. As a result, the life of such bricks is greatly prolonged, particularly in oxygen-blown converters, such as LD converters (oxygen top-blown converters).

For this reason, the prior art has used binders which contain as much carbon as possible, and finally even solid carbon has been added to the brick compositions in order to ensure a maximum residual carbon content in the bricks. The admixture of solid carbon, particularly carbon black, has actually resulted in some cases in an improved durability of bricks containing carbonaceous binders in converters. In other cases, and particularly more recently, when the requirements to be met by converter linings have increased, it has been found, however, that an admixture of carbon black is by no means successful in every case. It could be observed in such cases that there occurs a continual formation of cracks extending parallel to the hot face of the brick, and subsequently a more rapid wear of the bricks by peeling. On the other hand, tar-bonded bricks which contain no carbon black exhibit a continuous wear, by which the slag-infiltrated zone on the fire side is consumed substantially only by strictly chemical processes. For this reason, bricks with a content of tar, pitch or the like as a binder and an admixture of carbon black often had a shorter life than bricks which contain no carbon black.

It was at first not understood why bricks containing carbon black, and above all bricks with an addition of carbon black as high as possible, i.e. in an amount of about 2.0 to 2.5%, which addition was to be expected to prolong the life of the bricks, had a durability which was sometimes excellent and sometimes very poor.

It has now been found through investigations, and in accordance with the present invention, that an admixture of carbon black in an amount of 2.0 to 2.5%, which is generally the upper limit up to which carbon black can be incorporated in basic refractory bricks, results only in special cases in an increase of the durability of bricks, particularly in a converter. It has further been found in accordance with the present invention that the amount in which carbon black and elementary carbon in general is tolerable, depends decisively, that is, critically, on the $Fe_2O_3$ content of the refractory material, so that the amount of carbon black or elementary carbon must be selected in dependence on the $Fe_2O_3$ content of the refractory material.

Accordingly, the present invention provides unfired, refractory, basic bricks and compositions consisting essentially of basic refractory material of magnesia, dolomite, lime or their mixtures, together with a carbonaceous binder and an admixture of elementary carbon, where, based on the weight of the basic refractory material, they contain at most 1.5% by weight elementary carbon if their $Fe_2O_3$ content is below 0.5% by weight, not more than 1.75% by weight elementary carbon if their $Fe_2O_3$ content is 0.5 to 2.5% by weight, at most 2.0% by weight elementary carbon if their $Fe_2O_3$ content is above 2.5 to 4.5% by weight, and at most 2.5% by weight elementary carbon if their $Fe_2O_3$ content is above 4.5% by weight. The refractory materials magnesia, dolomite and lime contained in the bricks or compositions may be sintered or fused.

In the process according to the invention of producing such unfired bricks and compositions, the refractory material is mixed with the carbonaceous binder and the elementary carbon and the mixtures are shaped to form bricks, if desired, and the process is essentially characterized in that the amount of elementary carbon is selected in dependence on the $Fe_2O_3$ content of the refractory material in such a manner that elementary carbon is used, based on the weight of the refractory material, in an amount of at most 1.5% if the $Fe_2O_3$ content is below 0.5%, in an amount of not more than 1.75% if the $Fe_2O_3$ content is 0.5 to 2.5%, in an amount of at most 2.0% if the $Fe_2O_3$ content is 2.5 to 4.5%, and in an amount of not over 2.5% if the $Fe_2O_3$ content is above 4.5%. The elementary carbon is preferably used in an amount of 1.0% if the $Fe_2O_3$ content of the refractory material is below 0.5%, in an amount of 1.25% if the $Fe_2O_3$ content is 0.5 to 2.5%, in an amount of 1.5% if the $Fe_2O_3$ content is above 2.5 to 4.5%, and in an amount of 2.0% if the $Fe_2O_3$ content is above 4.5%.

The unfired compositions and bricks, in accordance with the present invention thus always contain small amounts of added elementary carbon. The amount of elementary carbon that can be used generally increases as the amount of $Fe_2O_3$ in the compositions and bricks increases with a maximum of 2.5% elementary carbon. The compositions and bricks generally contain, based on the weight of the basic refractory material, a minimum amount of 0.8% elementary carbon. Preferably, when the $Fe_2O_3$ content is below 0.5%, they contain a minimum of 0.8% elementary carbon; when the $Fe_2O_3$ content is 0.5 to 2.5%, they contain a minimum of 1.05% elementary carbon; when the $Fe_2O_3$ content is above 2.5 to 4.5%, they contain a minimum of 1.3% elementary carbon; and when the $Fe_2O_3$ content is above 4.5%, they contain a minimum amount of 1.8% elementary carbon. Thus, the present invention has found that the addition of elementary carbon to refractory compositions is useful in improving the durability of refractory shapes and bricks produced from these compositions, and that there are a number of ranges of $Fe_2O_3$ content of the refractory material for which the amount of elementary carbon cannot exceed certain critical values if the increase in durability is to be obtained.

Whereas carbon black is the preferred material for supplying elementary carbon and thus is mainly used for this purpose, it is also possible to use other types of elementary carbon such as finely ground coke, petroleum coke, electrode carbon or graphite. To incorporate the elementary carbon in the refractory mixture, it is preferable to jointly pregrind or premix the elementary carbon with the fine fraction of the refractory material, or simply to feed the elementary carbon into the mixing device in which all constituents are mixed.

The results which will be reported hereinafter have been obtained in tests using bricks having different $Fe_2O_3$ contents. The refractory material consisted of six sintered magnesias having the following compositions I to VI:

|  | I | II | III | IV | V | VI |
|---|---|---|---|---|---|---|
| $SiO_2$ | 0.3% | 0.6% | 0.7% | 0.8% | 1.1% | 3.6% |
| $Fe_2O_3$ | 5.7% | 4.1% | 3.3% | 2.0% | 0.45% | 0.20% |
| $Al_2O_3$ | 0.2% | 0.2% | 0.2% | 0.1% | 0.05% | 0.04% |
| CaO | 2.3% | 2.3% | 2.3% | 2.2% | 2.1% | 1.5% |
| MgO | 91.3% | 92.6% | 93.3% | 94.7% | 96.2% | 94.5% |
| Ignition loss | 0.2% | 0.2% | 0.2% | 0.2% | 0.10% | 0.16% |

Each of these six magnesias I to VI was used to make eight bricks which contained 5% tar and different amounts of carbon black, namely, 0.0%, 0.5%, 1.0%, 1.25%, 1.5%, 1.75%, 2.0%, and 2.5%. These 48 bricks were then subjected to the so-called OSM Test (Oxygen-Steel-Making Test), in which the action of slag and temperature on the bricks is substantially the same as in an oxygen-blowing converter. For this purpose, the bricks were placed in a small converter, in which eight charges of 20 kg liquid pig iron each were successively blown with oxygen to form steel. The bricks were then removed, cut at the center at right angles to the surface which faced the interior of the converter and the fire, and subjected to a chemical and microscopic examination at the surface of cut. In this way it is possible to detect all changes which the structure and composition of the bricks had suffered under the test conditions from the hot face to the cold face of the brick.

The following results were obtained:

In the bricks of magnesia I, no cracks were detected if carbon black was added in amounts up to 2.5%. The optimum admixture of carbon black is 2 to 2.3%.

In the bricks of magnesia II and III, no cracks were formed if up to 2.0% carbon black had been added. Cracks were increasingly formed in case of a carbon black content of above 2%. In this case, a carbon black content of 1.5% is most desirable.

The bricks of magnesia IV showed no crack formation with additions of carbon black of up to 1.75%, whereas with additions of over 1.75% cracks were increasingly formed.

In bricks of magnesia V and VI, cracks were to be detected if somewhat more than 1.5% carbon black had been added. In these bricks the optimum admixture of carbon black is about 1.0%.

From these investigations and numerous further tests, there results the following picture for the addition of carbon black in connection with the iron oxide content of the refractory material:

| $Fe_2O_3$: | 0 – 0.5% | >0.5 – 2.5% | >2.5 – 4.5% | >4.5% |
|---|---|---|---|---|
| Carbon black: | | | | |
| Preferably: | 1.0% | 1.25% | 1.5% | 2.0% |
| Maximum: | 1.5% | 1.75% | 2.0% | 2.5% |

Exactly the same results have been obtained with bricks consisting of fused magnesia having the above mentioned compositions I to VI, together with 5% tar or 5% pitch and the stated admixtures of carbon black. The same results have also been obtained when 3% tar, 3% hard pitch or 4% bitumen as well as the stated admixtures of carbon black were used together with sintered or fused magnesia having the compositions I to VI.

The rule on which the invention is based is also confirmed if magnesia is used in a mixture with dolomite and/or calcite.

All percentages and parts referred to herein and in the accompanying claims are by weight unless otherwise specifically indicated.

The invention in its broader aspects is not limited to the specific details shown and described and departures may be made from such details without departing from the principles of the invention and without sacrificing its chief advantages.

What is claimed is:

1. A process of producing an unfired, refractory, basic composition consisting essentially of refractory material of either magnesia, dolomite, lime or mixtures thereof, together with a carbonaceous binder and elementary carbon by mixing the refractory material with the carbonaceous binder and the elementary carbon, which comprises using an amount of elementary carbon in dependence on the $Fe_2O_3$ content of the refractory material so that elementary carbon is used, based on the weight of the refractory material, in an amount of from 0.8 to at most 1.5% if the $Fe_2O_3$ content is below 0.5%, in an amount of from 1.05 to not over 1.75% if the $Fe_2O_3$ content is 0.5 to 2.5%, in an amount of from 1.3 to at most 2.0% if the $Fe_2O_3$ content is above 2.5 to 4.5%, and in an amount of from 1.8 to not more than 2.5% if the $Fe_2O_3$ is above 4.5%.

2. A process according to claim 1 wherein the elementary carbon is used in an amount of 1.0% if the $Fe_2O_3$ content of the refractory material is below 0.5%, in an amount of 1.25% if the $Fe_2O_3$ content is 0.5 to 2.5%, in an amount of 1.5% if the $Fe_2O_3$ content is above 2.5 to 4.5%, and in an amount of 2.0% if the $Fe_2O_3$ content is above 4.5%.

3. A process according to claim 1 wherein carbon black is used as elementary carbon.

4. A process according to claim 1 wherein finely ground coke, petroleum coke, electrode carbon or graphite is used as elementary carbon.

5. The process according to claim 1 wherein the elementary carbon is incorporated in the refractory mixture by being jointly preground with part of the refractory material.

6. The process according to claim 1 wherein the elementary carbon is incorporated in the refractory mixture by being jointly premixed with part of the refractory material.

7. A process for producing a refractory brick comprising shaping the refractory composition produced by the process of claim 1.

8. A process for producing a refractory brick comprising shaping the refractory composition produced by the process of claim 2.

* * * * *